United States Patent [19]

Laakso et al.

[11] Patent Number: 5,232,482
[45] Date of Patent: Aug. 3, 1993

[54] METHOD FOR BENDING AND TEMPERING A GLASS SHEET

[75] Inventors: Tapio Laakso, Ruutana; Jukka H. Vehmas, Tampere; Esko O. Lehto, Kangasala, all of Finland

[73] Assignee: Tamglass Engineering Oy, Tampere, Finland

[21] Appl. No.: 841,486

[22] Filed: Feb. 26, 1992

[30] Foreign Application Priority Data

Feb. 12, 1992 [FI] Finland .................. 920589

[51] Int. Cl.$^5$ .................. C03B 23/023; C03B 27/044
[52] U.S. Cl. .......................... 65/104; 65/106; 65/107
[58] Field of Search ............ 65/104, 106, 107

[56] References Cited

U.S. PATENT DOCUMENTS 3,914,119 10/1975 Jack et al. .............. 65/104
3,951,634 4/1976 Hall et al. .............. 65/104
4,804,397 2/1989 Stas et al. .
5,147,440 9/1992 Leponen et al. .

FOREIGN PATENT DOCUMENTS

0338216A1 2/1989 European Pat. Off. .

Primary Examiner—Joye L. Woodard
Attorney, Agent, or Firm—Burns, Doane, Swecker & Mathis

[57] ABSTRACT

The invention relates to a method for bending and tempering a glass sheet. A glass sheet is supported on a ring mould during the course of heating, bending and tempering and the glass is heated for gravitational bending thereof. After a bending operation, the glass temperature is allowed to decrease to the range of 500°–550° C. throughout, followed by increasing the overall glass temperature to a tempering temperature by heating as quickly and uniformly as possible.

7 Claims, 8 Drawing Sheets

METHOD FOR BENDING AND TEMPERING A GLASS SHEET

FIELD OF THE INVENTION

The present invention relates to a method for bending and tempering a glass sheet, said method comprising
  supporting a glass sheet on a ring mould during the course of heating, bending and tempering and
  heating a glass sheet for gravitational bending thereof.

The scope of invention also covers those solutions in which gravitational bending is facilitated mechanically e.g. by using mechanical bending presses or an overhead press. The invention can also be applied when using hinged ring moulds.

BACKGROUND AND SUMMARY OF THE INVENTION

During the course of gravitational bending effected by means of a ring mould, it has been visually observed that, after the glass begins to bend and the central area of glass begins to "sag" downwards, this movement has been accelerating. Naturally, this acceleration is partially a result of the continuous rise of glass temperature but, nevertheless, this does not completely explain this high acceleration of movement. All in all, the bending of glass occurs very quietly until the "sagging" of the central area commences. Thus, the cooling must be commenced quickly and exactly at a correct moment. In the most preferred case, the bending should be stopped by cooling even before the glass is carried into another section or station. After a sufficient cooling, the glass can be carried forward without a risk of excessive bending.

Particularly, when using a hinged bending mould, it is possible that a lot of heat must be applied to certain areas and, thus, the temperature of these areas may rise above the tempering temperature.

An object of the present invention is to provide a method for bending and tempering a glass sheet, said method being capable of preventing the excessive bending of a glass sheet, eliminating the temperature differences in glass, and carrying a bent glass sheet to a tempering process at a sufficiently high temperature.

In order to achieve this object, a method of the invention is characterized in that, after a bending operation, the glass temperature is allowed to decrease to approximately 500°-550° C. throughout followed by increasing the overall glass temperature to a tempering temperature by heating as rapidly and uniformly as possible.

A method of the invention is capable of eliminating the temperature difference resulting in glass from bending in a simple manner without necessarily knowing the temperature profile in advance. A requirement for this is, however, that cooling and re-heating occur throughout at a constant rate (the coefficient of heat transfer must be as constant as possible). In a re-heating operation, the temperature increase must also be as rapid as possible in view of the process. The faster the re-heating is, the less additional bending occurs in glass during a heating operation.

BRIEF DESCRIPTION OF THE DRAWING FIGURES

A method of the invention will now be described in more detail with reference made to the accompanying drawings, in which FIG. 1 shows a plan view of a furnace assembly used for carrying out a method of the invention.

DETAILED DESCRIPTION OF THE PREFERRED EMBODIMENT

Figure 1:
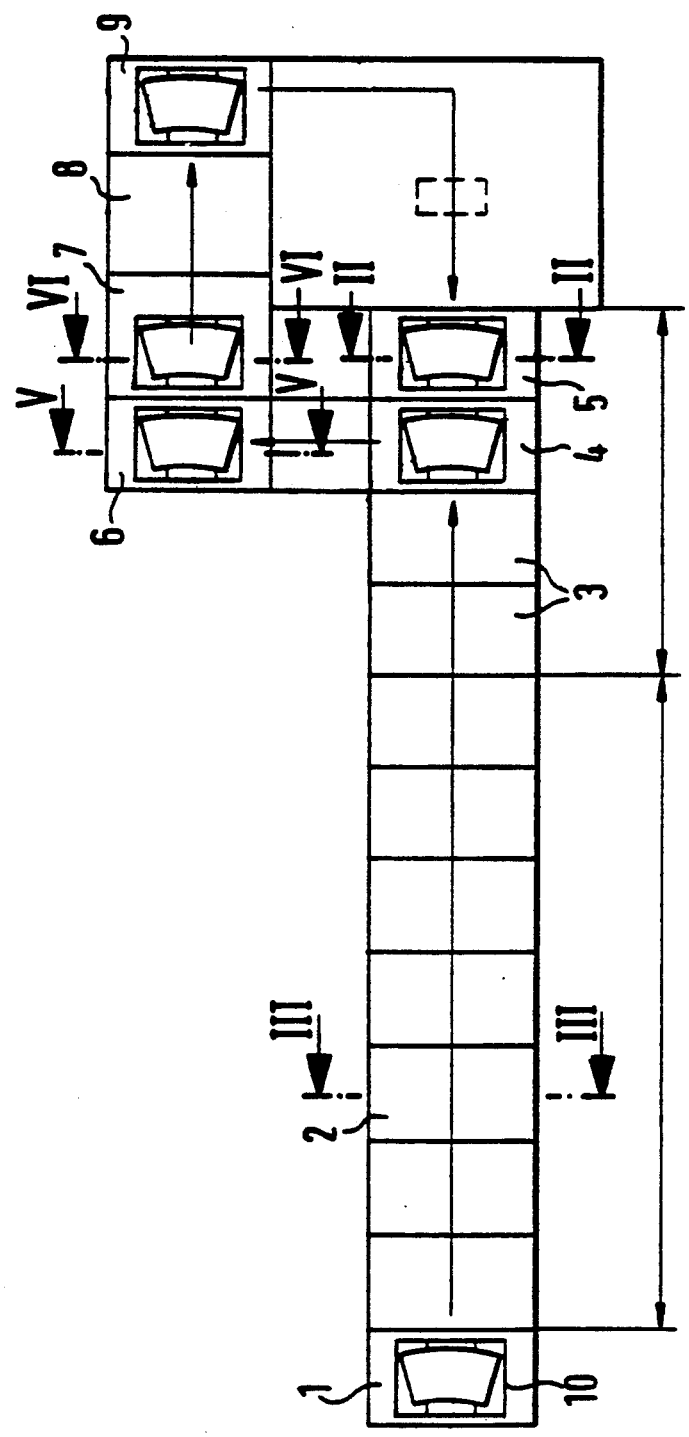
Figure 8:
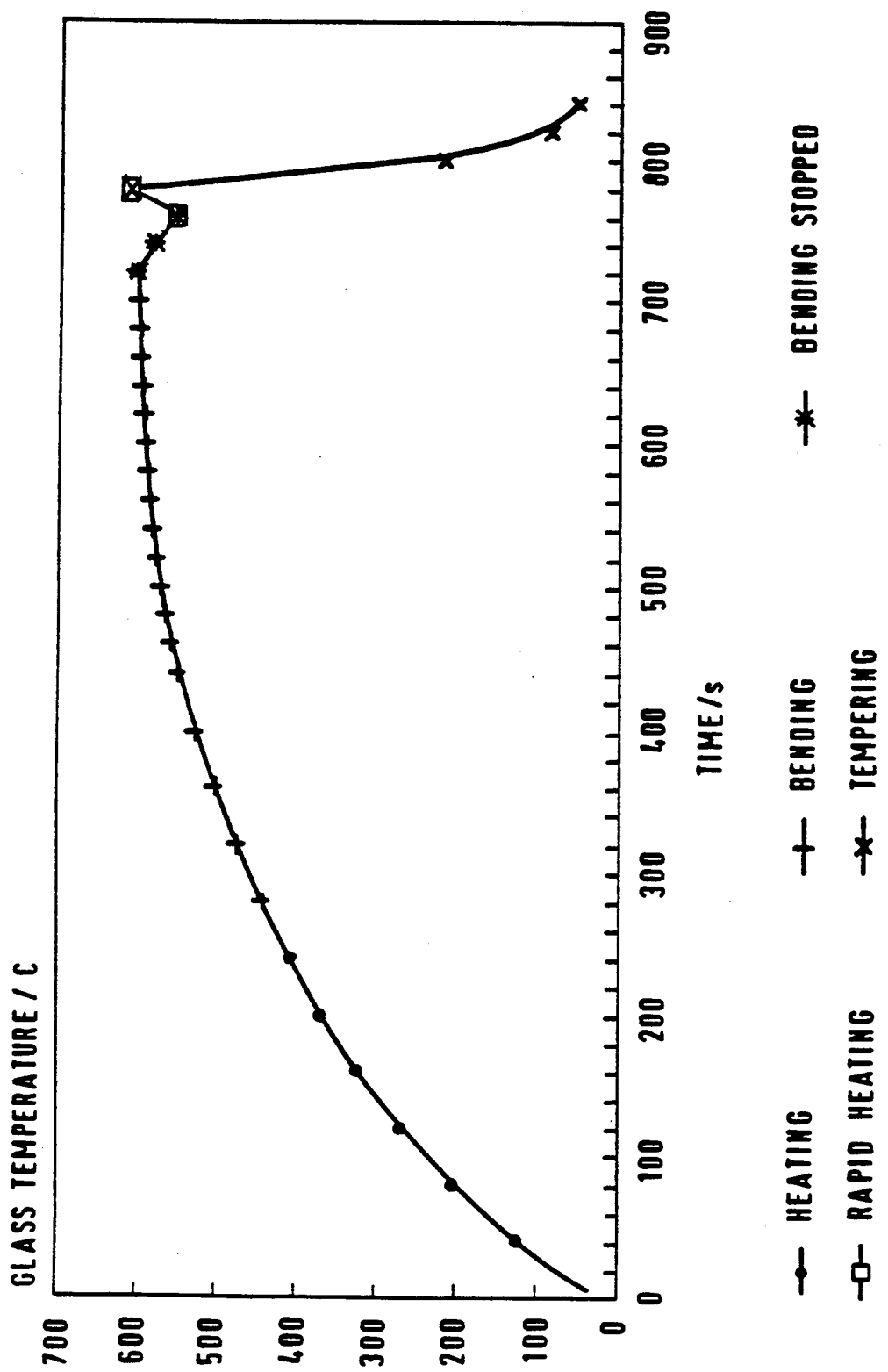
FIG. 8 shows the glass temperature as a function of time.

The general operating principle of a furnace will now be described with reference to FIG. 1. In a loading station 1, a glass sheet to be bent is placed on a ring mould 10 which is carried from one furnace station to another. In pre-heating stations 2, the glass temperature is gradually increased as indicated by the curve in FIG. 8. Since the heating occurs at a relatively slow rate, the furnace capacity is a factor that requires a plurality of pre-heating stations 2. In pre-heating stations 3, the glass sheet has reached a sufficiently high temperature to commence its gravitational bending. In an end station 5, the glass sheet reaches a final degree of bending, whereby it is lowered down onto a central run (a lower position in FIG. 2) and returned backwards through the distance of one station into an intermediate cooling chamber 4b of station 4 (FIG. 2A), wherefrom the mould along with its glass sheet is carried into an intermediate cooling station 6 and further into a rapid heating station 7. After a pre-heating treatment as quick as possible, the glass sheet is carried into a quenching station 8 and further into an unloading station 9.

On the central run level of station 5 there is a nonpartitioned communication by way of an intermediate cooling station 4b located on the central run of station 4 with an intermediate cooling station 6 and, thus, the central run of station 5 serves also as an intermediate cooling station.

Figure 2:
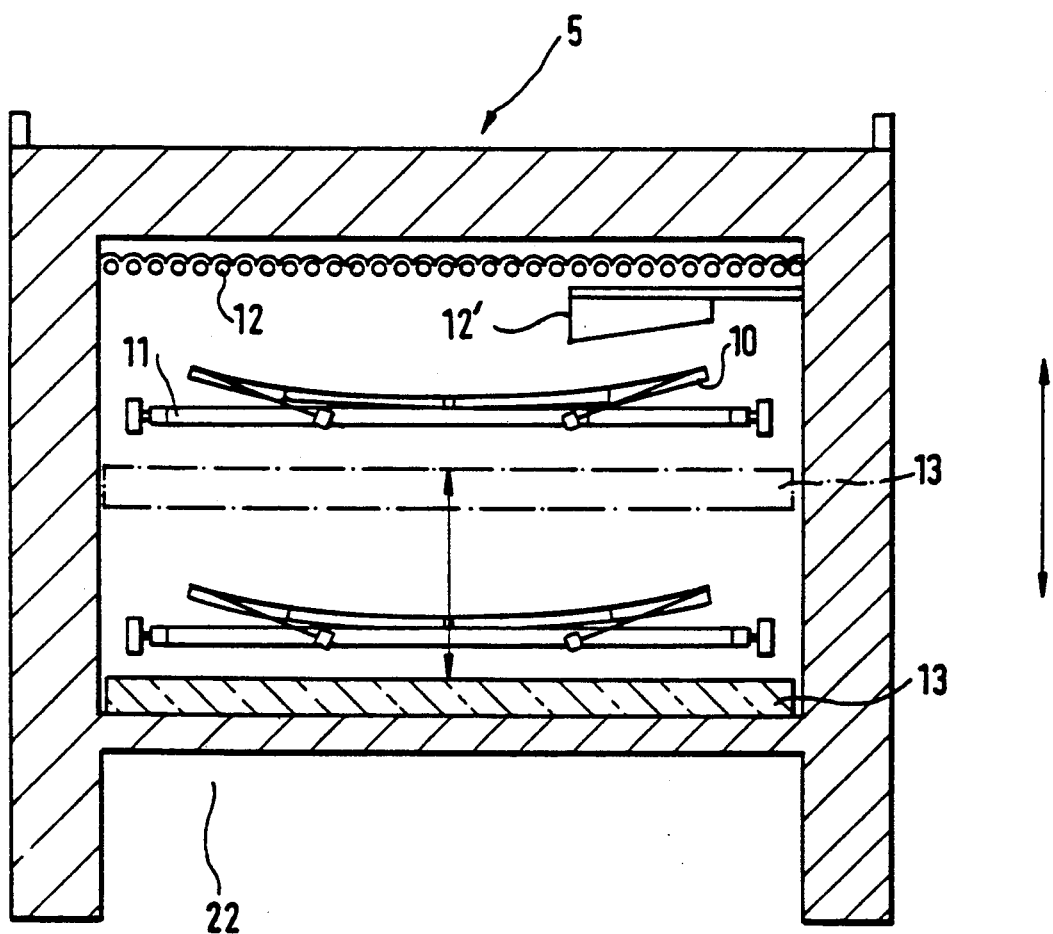
FIG. 2 shows an end station 5 of the furnace of FIG. 1 in a cross-section along a line II—II in FIG. 1.

FIG. 2 illustrates an end station 5, which is divided by means of a vertically movable floor 13 into an upper bending station and a lower intermediate cooling station, wherein the bending is stopped. During the course of bending a glass sheet said floor 13 is in a top position and the temperature in the chamber thereabove is appr. 650° C. Heating resistances 12 are used to heat a glass sheet supported by mould 10 until it reaches a desired degree of bending. Bending may be facilitated by the use here of an overhead partial or whole surface press 12', in any known manner, and for example, as is disclosed in U.S. Pat. No. 5,147,440 to Leponen et al., U.S. Pat. No. 4,804,397 to Stas et al, or EPO 338,216. The heating and bending operation is stopped by moving floor 13 and a mould carrier 11 supported thereby along with its mould 10 and glass sheet downwards until the mould carrier reaches the level of the central mould run or track. At this point, the glass sheet is in a horizontal communication with the central space 4b of station 4 and also with said station 6, maintaining a temperature of approximately 500° C. The glass sheet cools immediately in a sufficient degree to stop its bending. The mould along with its glass sheet is carried back into station 4 and floor 13 of station 5 is hoisted up. Another glass sheet to be bent is brought onto the upper run of end station 5. The cooling glass sheet is transferred from station 4 into intermediate cooling station 6, wherein its temperature is finally stabilized and settles within in a temperature range of 500°-550° C.

The same mould 10 is used for carrying a glass sheet from intermediate cooling chamber 6 into a rapid heating chamber 17, fitted with effective radiation heating elements 16 on either side of a glass sheet. The temperature in space 17 is preferably 800°-900° C. Although the heating is in this case mainly effected by means or radiation, it may be appropriate to supplement this with forced convection.

The above assembly is just one example of many possible constructions for carrying out a method of the invention. For example, an intermediate cooling chamber 6 and a rapid heating chamber 7 as well as a tempering station 8 can be positioned directly as an extension of stations 3, 4, 5, thus eliminating the need for lateral movements. The return of carriers and moulds can also be arranged some other way than underneath said stations 2-5.

Figure 7:
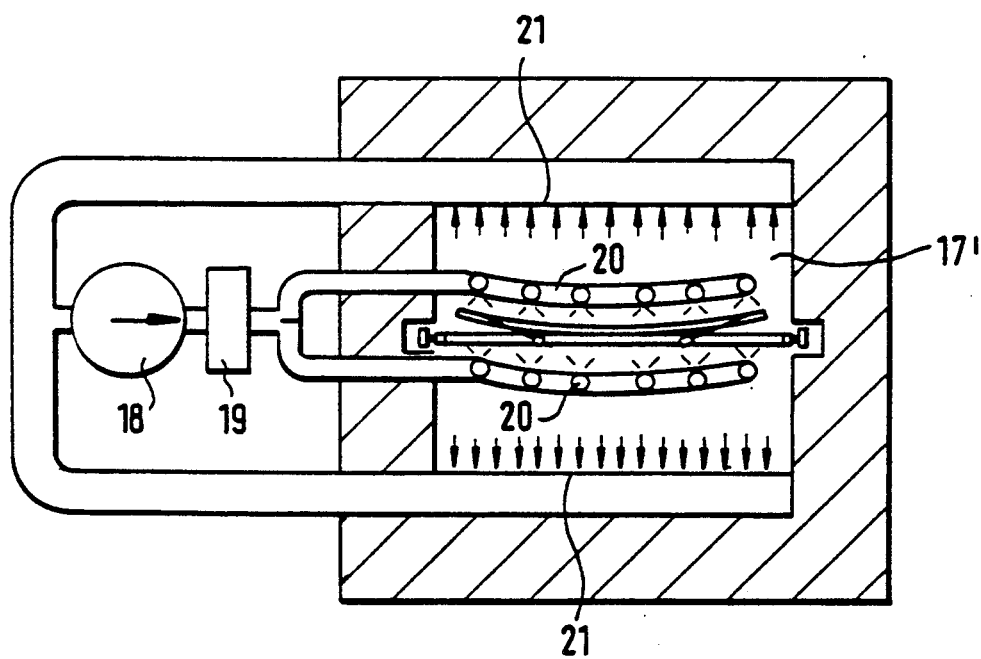
FIG. 7 shows a schematic cross-section of a rapid heating chamber according to an alternative embodiment.

FIG. 7 illustrates an alternative embodiment for a rapid heating chamber, wherein the heating is effected mainly by the application of forced convection or hotait blasting. A fan 18 is used for circulating air by sucking it through perforated plates 21 mounted on the floor and ceiling of a chamber 17'. In a heater 19, the air is heated to a temperature of 750°-800° C. and blasted from perforated nozzle tubes 20 to each surface of a glass sheet.

In rapid heating chamber 17 or 17', the glass temperature is quickly raised again to a suitable tempering temperature of 610°-630° C. Thereafter, a glass sheet is advanced further by means of the same mould 10 and a light carrier 11 to a quenching station 8, wherein the quenching is effected in a per se known manner by subjecting each surface of a glass sheet to a powerful cooling-air blast. In an unloading station 9, a bent and tempered glass sheet is removed from the mould, followed by returning said mould 10 together with its carrier 11 along a lower furnace track 22 into loading station 1.

Figure 2A:
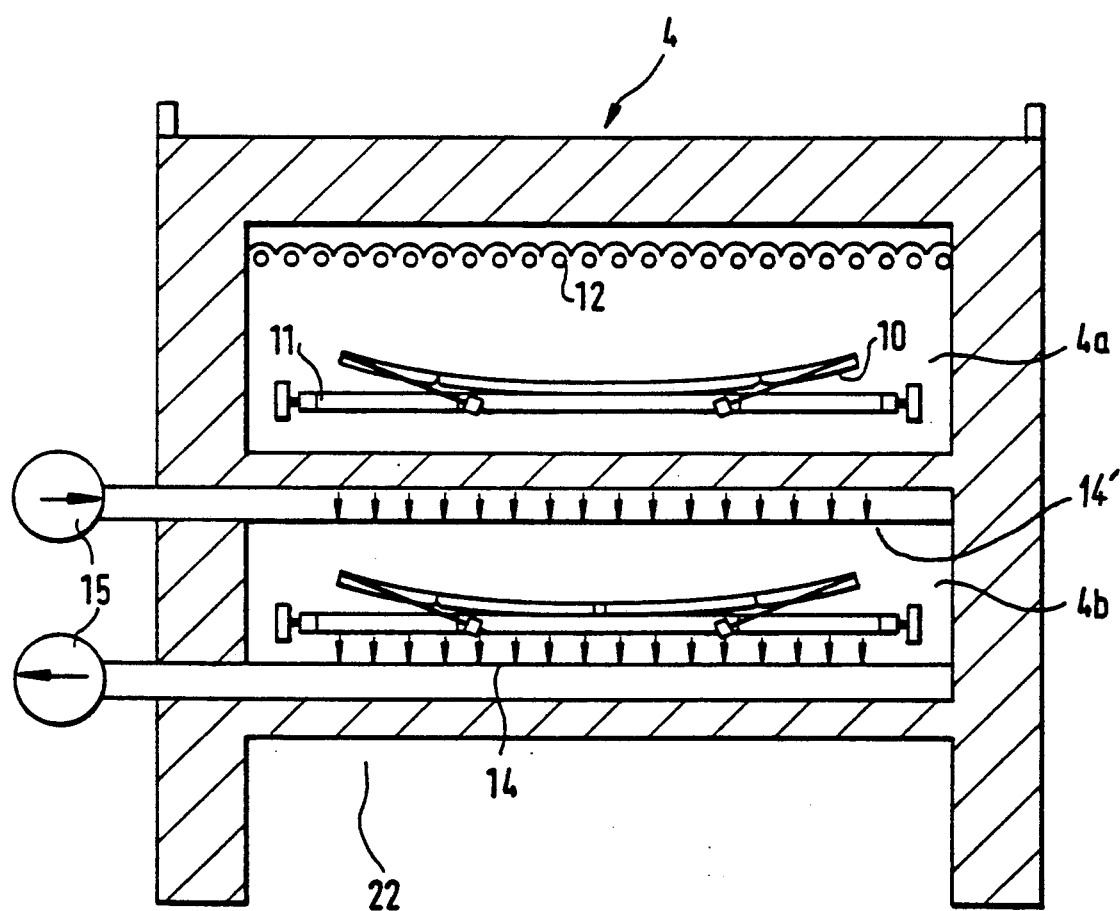
FIG. 2A is a cross-section similar to FIG. 2 but shows a station 4 preceding the end station.
Figure 3:
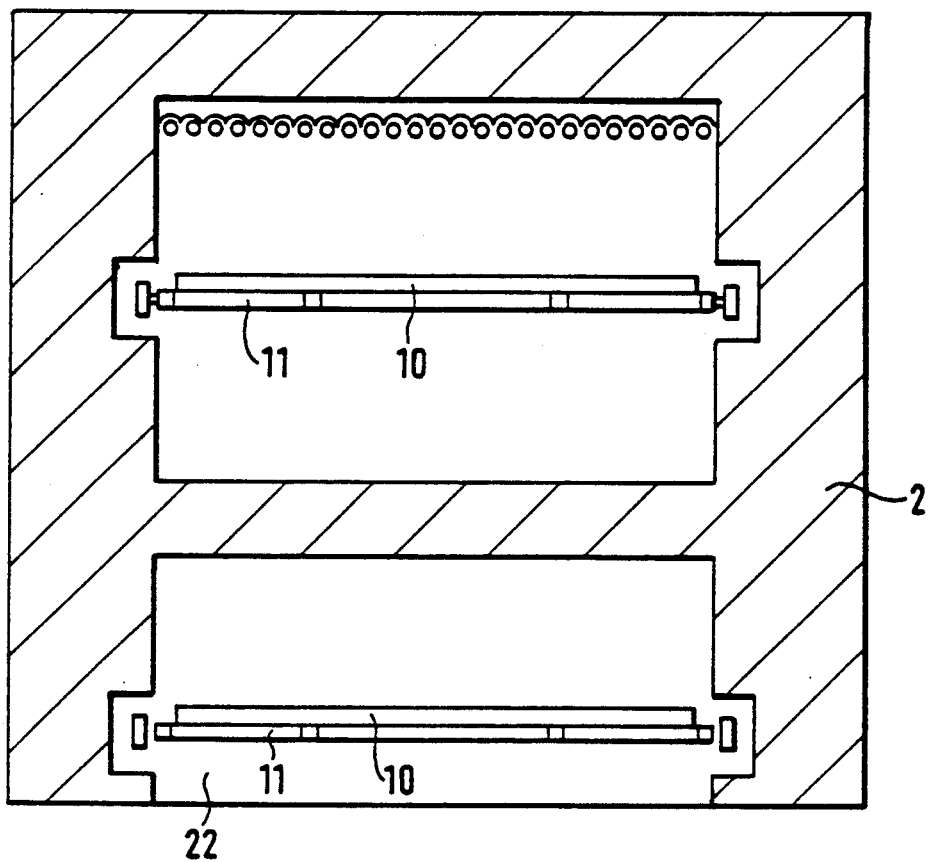
FIG. 3 shows a cross-section of a pre-heating station 2 along a line III-III in FIG. 1, illustrating the pre-heating of glass effected on the upper run and the return of a ring mould effected on the lower run.
Figure 4:
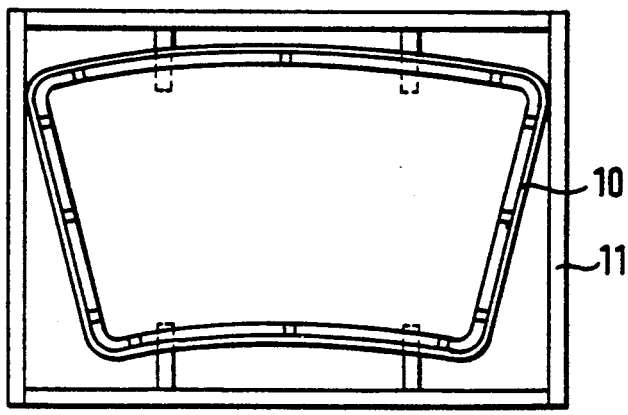
FIG. 4 is a plan view of a ring mould 10 and its carrier 11.
Figure 5:
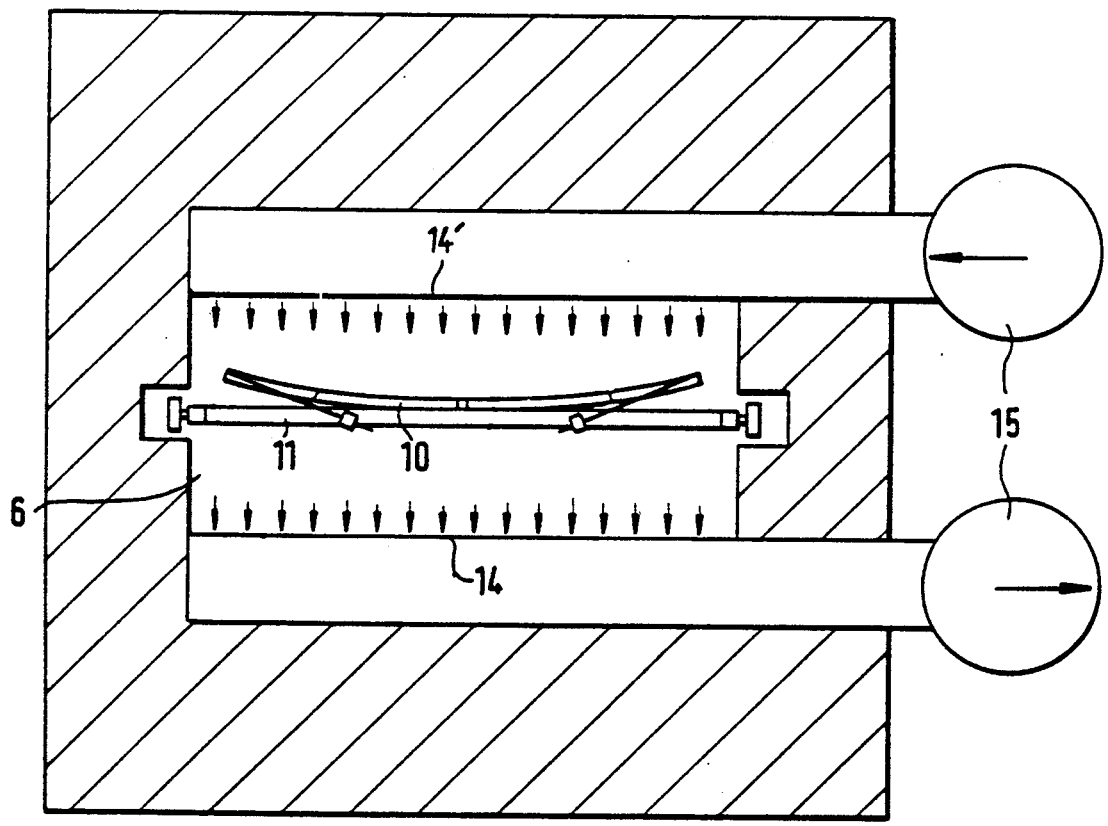
FIG. 5 shows a cross-section of a cooling chamber along a line V—V in FIG. 1.
Figure 6:
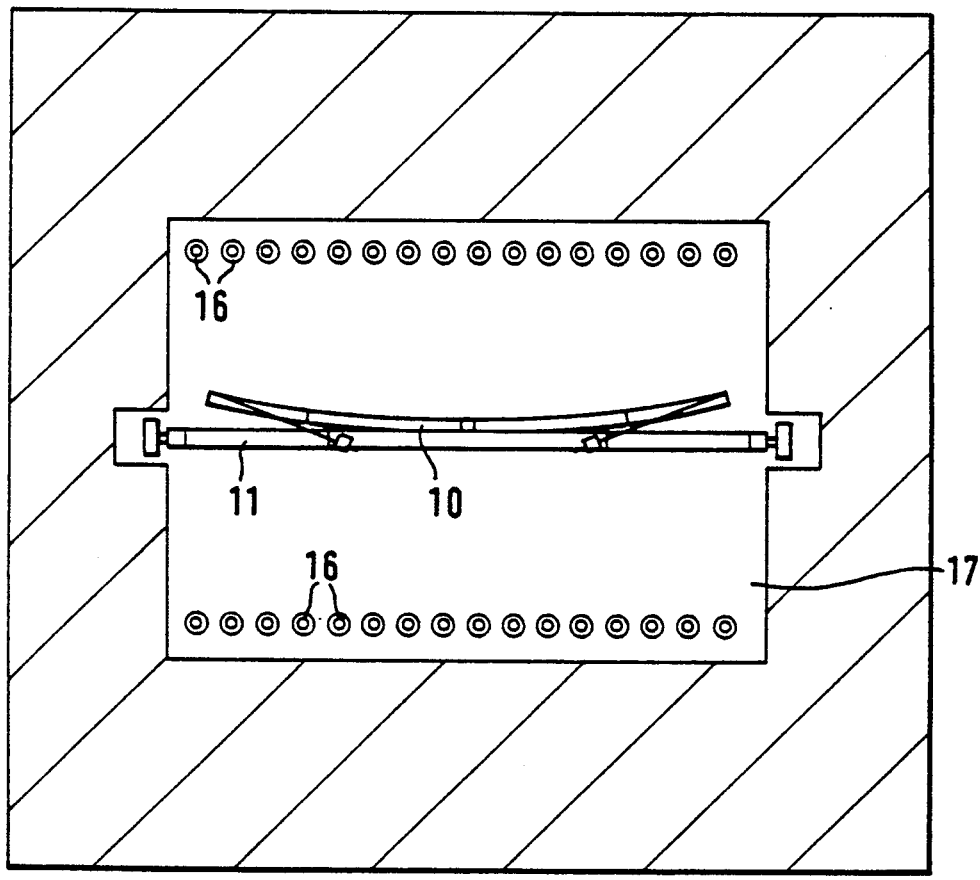
FIG. 6 shows a cross-section of a rapid heating chamber according to a first embodiment along a line VI—VI in FIG. 1.

In intermediate cooling chambers 4b and 6 as shown in FIGS. 2a and 5, the air temperature is maintained constant by using fans 15 to circulate a suitable amount of air at room temperature through chambers 4b and 6. In the present case, the entrance of air into chamber 4b or 6 proceeds through a perforated plate 14 mounted on the chamber ceiling and the air is sucked from chamber 4b or 6 through a perforated plate 14 defining its bottom.

We claim:

1. A method for bending and tempering a glass sheet, comprising:
    supporting a glass sheet on a ring mould during the course of heating, bending and tempering;
    heating the glass sheet for gravitational bending;
    allowing, after bending, the glass sheet temperature to decrease throughout to approximately 500°-550° C.; and,
    increasing the overall glass sheet temperature to a tempering temperature by heating as rapidly and uniformly as possible.

2. A method as set forth in claim 1, wherein the bending of the glass sheet to a final configuration is facilitated by using an overhead partial or whole surface press.

3. A method as set forth in claim 1, wherein the step of increasing the overall glass sheet temperature for tempering is effected in a separate chamber and the heating therein is mainly effected by means of forced convection.

4. A method as set forth in claim 1, wherein the step of increasing the overall glass sheet temperature for tempering is effected in a separate chamber having a temperature within the range of 800°-900° C.

5. A method as set forth in claim 1, wherein heating is mainly effected by means of radiation with the additional application of forced convection.

6. A method as set forth in claim 1, wherein, during the step of increasing the overall glass temperature to a tempering temperature, the glass temperature is increased to the range of 610°-630° C.

7. A method as claimed in claim 3, wherein heating by forced convection comprises hot air blasting.

* * * * *